United States Patent

[11] 3,608,087

[72] Inventors Arthur A. Patchett;
Dale R. Hoff, Cranford, N.J.; Clarence S. Rooney, Beaconsfield, Quebec, Canada
[21] Appl. No. 738,801
[22] Filed June 21, 1968
[45] Patented Sept. 21, 1971
[73] Assignee Merck & Co. Inc.
Rahway, N.J.

[54] FEED COMPOSITIONS
5 Claims, No Drawings
[52] U.S. Cl. ................................................ 424/320,
260/557, 260/558, 260/561, 424/324
[51] Int. Cl. .............................................. A61k 27/00
[50] Field of Search ................................... 424/320,
324; 260/561 X; 99/2, 2 N

[56] References Cited
UNITED STATES PATENTS
2,419,888 4/1947 Nolan et al. .................. 424/320
3,206,509 9/1965 Nyquist et al. ................ 260/561 X
3,314,849 4/1967 Hamm .......................... 424/320

OTHER REFERENCES
Belasco (Journal of Animal Science), Vol. 13, No. 3 (8/54) pages 604– 605
Chemical Abstracts Vol. 67 (1967) 41225d.

Primary Examiner—Albert T. Meyers
Assistant Examiner—Frederick E. Waddell
Attorneys—John Frederick Gerkens, J. Jerome Behan and I. Louis Wolk ABSTRACT: The disclosure relates to methods and compositions for controlling the formation of methane in rumen fermentation through the use of compounds containing halogen bonded to carbon which is in turn attached directly to a functional group. Preferred compounds are amides, alcohols, ketones, sulfones, sulfoxides, carboxylic acids, amines, sulfonamides and phosphonic acid derivatives. The disclosure also relates to novel compounds including N-(2-hydroxypropyl) derivatives of di- and trihaloamides and the N-(2-hydroxyethyl) derivatives of trihaloacetamides.

FEED COMPOSITIONS

BACKGROUND OF THE INVENTION

1. Field of the Invention

This application relates to novel methods for improving the efficiency of utilization of feed elements in ruminants and to novel feed compositions. It also relates to novel compounds and the processes for making and using the same.

2. Description of the Prior Art

The ruminant family of mammals is characterized by a digestive process wherein ingested feed materials are subjected to an initial fermentation process in the rumen to give products, notably fatty acids, which can be utilized for the nourishment of the animal. Certain organisms such as Methanobacterium ruminantium, which are normally present in the rumen, produce methane rather than the useful fatty acids as their major fermentation product. The methane is not further utilized by the animal, and the carbon values represented thereby are lost, a loss which can approach 10 percent of the carbon values of the original feed. It is, therefore, desirable to minimize the production of methane in the rumen and to maximize the production of desirable lower fatty acids such as propionic and butyric acids in order to realize the greatest possible efficiency from the feed supplied. Such increased efficiency results in a larger weight gain in the animal for a given amount of feed, and reduced feed costs.

Heretofore, there has been no known method for suppressing methane formation in the rumen and improving feed efficiency which has found commercial acceptance.

SUMMARY OF INVENTION

The present invention provides a class of halogenated compounds which are useful in the suppression of methane formation in the rumen. The invention also provides a method for treating ruminants to maximize feed efficiency. There is further provided novel feed and premix compositions and the method for using the same.

The compounds which have been found useful, in accordance with this invention, in suppressing methane formation, increasing feed efficiency and providing an increase in desirable lower fatty acids are compounds which contain at least one chlorine, bromine or iodine atom, preferably at least two such atoms, attached to a carbon atom which is, in turn, attached to a single functional group. This structure has been found characteristic of a high order of methane suppressant activity. For example, the useful compounds can be amides, alcohols, carboxylic acids and esters, ketones, amines, sulfones, sulfoxides, sulfonamides, and phosphoric acid derivatives, each containing at least one, and preferably at least two, chlorine, bromine or iodine atoms alpha to the designated functional group. The useful compounds are those wherein the noted halogen atoms are activated by a single functional group, but are not sources of positive halogen such as dibromomalonamide wherein the attached halogen is activated by two functional groups.

The compounds which are useful in the practice of this invention include the following:

a. amides of the general formula

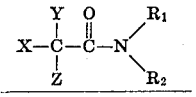

wherein X is hydrogen, lower alkyl, monocarbocyclic aryl, lower cycloalkyl, chlorine, bromine or iodine; Y is hydrogen, lower alkyl, chlorine, bromine or iodine; Z is chlorine, bromine or iodine; and each of $R_1$ and $R_2$ is hydrogen, lower alkyl, lower cycloalkyl, monocarbocyclic aryl, heteroaryl, carbamyl or lower alkylene joined together or with the group X by carbon, oxygen or nitrogen to form a cyclic structure;

b. alcohols of the formula

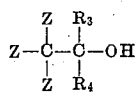

wherein Z is as defined above and the Z groups are the same or different, and each of $R_3$ and $R_4$ is hydrogen, lower alkyl or monocarbocyclic aryl;

c. ketones of the formula

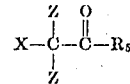

wherein X and Z are as defined above and the Z groups are the same or different, and $R_5$ is lower alkyl, monocarbocyclic aryl or

d. sulfones of the formula

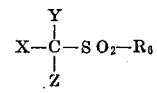

wherein X, Y and Z are as defined above and $R_6$ is lower alkyl, monocarbocyclic aryl or

e. sulfoxides of the formula

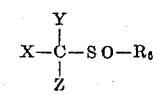

wherein X, Y, Z and $R_6$ are as defined above;

f. carboxylic acids and esters thereof of the formula

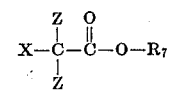

wherein X and Z are as defined above, the Z groups are the same or different, and $R_7$ is hydrogen or lower alkyl;

g. amines of the formula

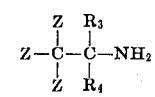

wherein Z, $R_3$ and $R_4$ are as defined above and the Z groups are the same or different;

h. sulfonamides of the formula

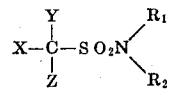

wherein X, Y, Z, $R_1$ and $R_2$ are as defined above;

i. phosphonic acid derivatives of the formulae

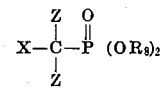

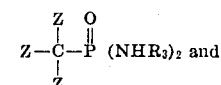

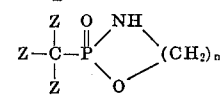

wherein X, Z and $R_3$ are as defined above, the Z groups are the same or different, $R_8$ is lower alkyl, and $n$ is a small integer greater than 1, typically 2–4.

The groups X, Y, $R_1$, $R_2$ $R_3$, $R_4$, $R_5$, $R_6$, $R_7$ and $R_8$ may bear one or more inert and nontoxifying substituents compatible with the group such as halogen, lower alkyl, monocarbocyclic aryl, halo-lower alkyl, nitro, monocarbocyclic aroyl, lower alkanoyl, carboxy, carbo-monocarbocyclic aryloxy, lower alkoxy, monocarbocyclic aryloxy, lower alkylthio, carbamyl, lower alkyl carbamyl, monocarbocyclic aryl carbamyl, sulfonamido, amino, cyano, etc. Accordingly, the useful lower alkyl groups may be halo-lower alkyl, monocarbocyclic aryl lower alkyl, hydroxy lower alkyl, heteroaryl lower alkyl, lower alkoxy lower alkyl, carbo-lower alkoxy lower alkyl, monocarbocyclic aryloxy, lower alkyl, lower alkanoyl lower alkyl, carbamyl lower alkyl, lower alkyl carbamyl lower alkyl, etc. Similarly substituted cycloalkyl groups can be employed. Monocarbocyclic aryls which may be employed include haloaryl, halo-lower alkyl aryl, lower alkaryl, nitroaryl, carboxyaryl, lower alkoxy aryl, hydroxyaryl, hydroxy lower alkyl aryl, aminoaryl, lower alkanoyl aryl, carbo-lower alkoxy aryl, sulfonamidoaryl, etc. Heteroaryl groups which may be used include lower alkyl heteroaryl, halo-lower alkyl heteroaryl, lower alkoxyheteroaryl, carboxyheteroaryl, aminoheteroaryl, lower alkanoyl heteroaryl, carbo-lower alkoxy heteroaryl, etc.

Where the functional group of the active compound contains a replaceable hydrogen atom, it may bear an inert substituent. For example, amides may be substituted by an amino group to form a hydrazide, or by a carbamyl group to form a urea. Alcohols may be substituted by a lower alkyl group to form an ether, or by a lower alkanoyl or monocarbocyclic aroyl group to form an ester. Amines may be used in the from of nontoxic salts, such as amine hydrochlorides. Carboxylic acids may be used in the form of soluble salts such as alkali metal or ammonium salts.

It is preferred that the total number of carbon atoms contained in each of the groups X, Y, $R_1$, $R_2$, $R_3$, $R_4$, $R_5$, $R_6$, $R_7$, and $R_8$ be less than about 10. Higher lipophilic carbon chains tend to decrease the solubility of the compound in the rumen fluids to a point where they are no longer present in effective amounts due to insolubility.

A lower alkyl group, as that term is used herein, is an alkyl group containing less than 10 carbon atoms. Specific examples of useful lower alkyl groups include methyl, ethyl, n-propyl, isopropyl, n-butyl, secbutyl, isobutyl, amyl, hexyl, heptyl, octyl, nonyl, trifluoromethyl, 2-chloroethyl, 2, 2-dichloroethyl, 1-bromoethyl, 2-chloropropyl, 2-hydroxyethyl, 2-hydroxypropyl, 3-hydroxypropyl, benzyl, 2-phenylethyl, 2-phenylpropyl, nitrobenzyl, methylbenzyl, and similarly substituted methyl, ethyl, n-propyl, isopropyl, n-butyl, sec-butyl, amyl, hexyl, heptyl, octyl and nonyl radicals. Suitable specific cycloalkyls include cyclopentyl, cyclohexyl, cycloheptyl and inertly substituted derivatives thereof. Specific heteroaryls include pyrryl, pyridyl, triazolyl, thiazolyl, pyranyl, furyl, pyrrolidyl, pyrimidyl, imidazolyl, and benzimidazolyl. Useful monocarbocyclic aryls include phenyl, nitrophenyl, trifluoromethylphenyl, tolyl, xylyl, ethylphenyl and similarly substituted phenyl radicals. It will be understood that the above-described substituents X, $R_2$, $R_3$, $R_5$, $R_6$, $R_7$ and $R_8$ can constitute a bridging group in order to form dimeric compounds illustrated by the following:

$$X-\underset{\underset{Y}{|}}{\overset{\overset{Z}{|}}{C}}-\overset{O}{\overset{\|}{C}}-\overset{R_1}{\underset{|}{N}}-R_2-\overset{R_1}{\underset{|}{N}}-\overset{O}{\overset{\|}{C}}-\underset{\underset{Y}{|}}{\overset{\overset{Z}{|}}{C}}-X$$

$$Z-\underset{\underset{Z}{|}}{\overset{\overset{Z}{|}}{C}}-\underset{\underset{OH}{|}}{\overset{\overset{R_4}{|}}{C}}-R_3-\underset{\underset{OH}{|}}{\overset{\overset{R_4}{|}}{C}}-\underset{\underset{Z}{|}}{\overset{\overset{Z}{|}}{C}}-Z$$

$$X-\underset{\underset{Z}{|}}{\overset{\overset{Z}{|}}{C}}-\overset{O}{\overset{\|}{C}}-R_5-\overset{O}{\overset{\|}{C}}-\underset{\underset{Z}{|}}{\overset{\overset{Z}{|}}{C}}-X$$

$$X-\underset{\underset{Y}{|}}{\overset{\overset{Z}{|}}{C}}-SO_2-R_5-SO_2-\underset{\underset{Y}{|}}{\overset{\overset{Z}{|}}{C}}-X$$

$$X-\underset{\underset{Y}{|}}{\overset{\overset{Z}{|}}{C}}-SO_2-\overset{R_1}{\underset{|}{N}}-R_2-\overset{R_1}{\underset{|}{N}}-SO_2-\underset{\underset{Y}{|}}{\overset{\overset{Z}{|}}{C}}-X$$

Similarly, trimeric or even higher polymeric forms are possible, as exemplified by compounds of the formula $$CCl_3-\underset{\underset{CH_3}{|}}{\overset{\overset{OH}{|}}{CH}}-CH_2-(-OCH-CH_2-)_a-O-CHCH_2OH\underset{\underset{CCl_3}{|}}{}$$

wherein $a$ is integer.

The preferred X substituents are hydrogen, chlorine, bromine, unsubstituted lower alkyl, chloro-lower alkyl and bromo-lower alkyl. The preferred Y and Z substituents are chlorine and bromine. In all cases, it is preferred that the X, $R_1$, $R_2$, $R_3$, $R_4$, $R_5$, $R_6$, $R_7$, and $R_8$ moieties be free of ionic substituents such as quaternary ammonium, amidinium, free sulfonic acid or phosphoric acid groups, etc., since the presence of such ionic substituents tends to decrease markedly the activity of the compounds in suppressing methane formation in the rumen.

In general, the preferred classes of compounds for use in the invention are the following, in which the halgen is chlorine or bromine:

a. di- and trihalogenated amides
b. trihalogenated alcohols
c. di- and trihalogenated ketones
d. mono-, di- and trihalogenated sulfones
e. mono-, di- and trihalogenated sulfoxides
f. trihalogenated carboxylic acids
g. trihalogenated amines
h. di- and trihalogenated sulfonamides; and
i. di- and trihalogenated phosphonic acid derivatives.

With regard to compounds of category a., those having at least one hydrogen attached to the amido nitrogen generally show the highest activity, although the disubstituted amides are also active.

Compounds employed in the practice of this invention can be prepared by known methods of synthesis. For example, α-haloamides are readily prepared by the reaction of the corresponding amine and acyl halide according to the equation:

(1) $$X-\underset{\underset{Y}{|}}{\overset{\overset{Z}{|}}{C}}-\overset{O}{\overset{\|}{C}}-Cl + 2NH\overset{R_1}{\underset{R_2}{<}} \longrightarrow X-\underset{\underset{Y}{|}}{\overset{\overset{Z}{|}}{C}}-\overset{O}{\overset{\|}{C}}-N\overset{R_1}{\underset{R_2}{<}} + NH\overset{R_1}{\underset{R_2}{<}}·HCL$$

or by the reaction of a cleavable ester such as a methyl or phenyl ester with an amine according to the equation:

(2) $$X-\underset{\underset{Y}{|}}{\overset{\overset{Z}{|}}{C}}-\overset{O}{\overset{\|}{C}}-OCH_3 + NH\overset{R_1}{\underset{R_2}{<}} \longrightarrow X-\underset{\underset{Y}{|}}{\overset{\overset{Z}{|}}{C}}-\overset{O}{\overset{\|}{C}}-N\overset{R_1}{\underset{R_2}{<}} + CH_3OH$$

The sulfonamides and phosphonamides can be prepared by substituting the appropriate sulfonyl or phosphonyl chloride for the acyl chloride in reaction (1). The trihalogenated amines and alcohols are all readily available compounds or simple derivatives thereof. The carboxylic acids are similarly available or readily prepared and the corresponding esters are made by direct esterification or by converting the acid to the acyl halide or anhydride, followed by reaction with the desired alcohol.

Sulfoxides and sulfones are prepared by progressive oxidation of the corresponding sulfides, suitably by hydrogen peroxide, according to the equation:

(3) $$X-\underset{\underset{Z}{|}}{\overset{\overset{Y}{|}}{C}}-S-R_6 \xrightarrow{[O]} X-\underset{\underset{Z}{|}}{\overset{\overset{Y}{|}}{C}}-SO-R_6 \xrightarrow{[O]} X-\underset{\underset{Z}{|}}{\overset{\overset{Y}{|}}{C}}-SO_2-R_6$$

where the ultimate sulfoxide or sulfone is an alpha-monohalogenated compound, the sulfide starting material can be prepared by haloalkylation of the corresponding mercaptan, according to the equation:

(4) $$R_6SH + XCHO + HZ \longrightarrow X-\underset{\underset{Z}{|}}{\overset{\overset{H}{|}}{C}}-S-R_6$$

Phosphonic acid esters are typically prepared by reaction of the corresponding phosphonyl chlorides and alcohols. The cyclic mixed phosphonamide-esters are most conveniently prepared by reacting a phosphonyl chloride with an aminoalcohol in the presence of an acid acceptor such as a tertiary amine, according to the equation:

(5)

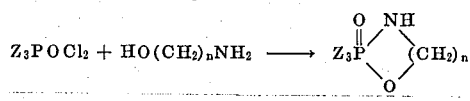

The invention also provides certain novel halogenated N-hydroxyalkyl amide compounds which are especially suitable for use in improving the efficiency of feed utilization in ruminants. These novel compounds are characterized by the structures:

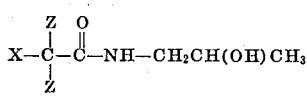

and

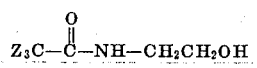

The compounds contemplated by the above structures include the N- (2-hydroxypropyl) derivates of dichloroacetamide, dibromoacetamide, diiodoacetamide, trichloroacetamide, tribromoacetamide, 2,2-dichloropropionamide, 2,2-dibromopropionamide, 2,2,3-trichloropropionamide, 2,2-dichlorophenylacetamide, 2,2-dichloro-$n$-butyramide, 4-hydroxy -2,2-dichlorobutyramide, 2-ethoxy-2,2-dichloroacetamide, etc.; and the N-(2-hydroxy-ethyl) derivatives of trichloroacetamide and tribromoacetamide. The preferred members of this class are N-(2-hydroxypropyl) dichloroacetamide and N-(2-hydroxyethyl) trichloroacetamide.

The novel compounds are typically prepared as illustrated in the following equations:

(6)

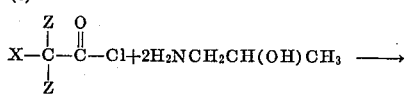

(7)

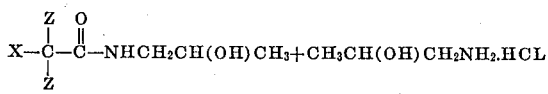

(8)

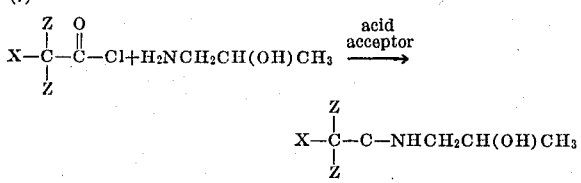

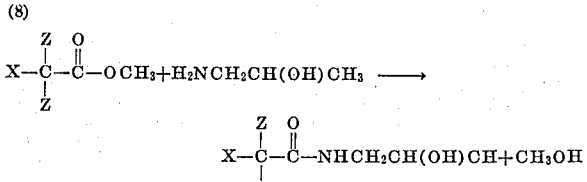

Similarly, the N-(2-hydroxyethyl) alpha trihaloamides are prepared as in equations (6), (7), and (8) by using a trihalo acyl halide or ester and 2-aminoethanol. In place of any of the acyl halides, there may be used the free acid or an anhydride thereof. In equation (8), other cleavable esters such as the ethyl, propyl or phenyl ester can be employed.

Preparation of the novel compounds of the invention may be illustrated by the following illustrative examples: Example 1-N-(2-hydroxypropyl) trichloroacetamide Trichloroacetyl chloride (18.2 gm.) is dispersed in 50 ml. of chloroform and the solution is cooled in an ice bath. A solution of 2-aminopropanol (15 gm.) in 20 ml. of chloroform is added with stirring over a period of about 10 minutes. An additional 30 ml. of chloroform is added and the mixture is stirred for about 2.5 hours. The solution is then separated from the oily hydrochloride, washed with water and dried over sodium sulfate. The solution is evaporated to dryness, and the solid residue is recrystallized from benzene to give 6.2 gm. of N-(2-hydroxypropyl) trichloroacetamide, melting point 66°–69 C. and containing 27.63 percent C (27.23 percent theory); 3.66 percent H (3.67 percent theory); 6.20 percent N (6.35 percent theory); and 47.56 percent Cl (48.24 percent theory).

By substituting dichloroacetyl chloride for trichloroacetyl chloride, there is prepared N-(2-hydroxypropyl) dichloroacetamide, melting point 69°–70° C. Example 2-N-(2-hydroxyethyl) trichloroacetamide Trichloroacetyl chloride (18.2 gm.) is dissolved in 50 ml. of chloroform. The solution is cooled in an ice bath and a solution of 12.2 gm. of 2-aminoethanol in 20 ml. of chloroform is added, with stirring, over about 10 minutes. An additional 30 ml. of chloroform is added and the mixture is stirred for about 2.5 hours. The crystalline hydrochloride is filtered off and the filtrate is taken to dryness. The residue is recrystallized from benzene to give 4.25 gm. of N-(2-hydroxyethyl) trichloroacetamide, melting point 55°–57.5° C. and containing 23.61 percent C (23.56 percent theory); 2.88 percent H (2.93 percent theory); 6.85 percent N-(6.78 percent theory); and 50.17 percent Cl (51.51 percent theory).

These novel compounds possess high activity together with high stability and low volatility. It is thus possible to prepare feed compositions and premixes containing the compounds which are unaffected by long periods of storage and do not lose activity through evaporation. They are also soluble in rumen fluids in effective amounts. The 2-hydroxypropyl amide derivatives are appreciably more resistant to enzymatic cleavage in the rumen than the isomeric 3-hydroxypropyl derivatives (as shown by carbon-14 tracer studies). In addition these novel amide derivatives although absorbed through the rumen wall, are absorbed at a slower rate than that of amide derivatives possessing less polar substituents. Thus the combination of greater resistance to enzymatic cleavage and relatively slow absorption through the rumen wall results in the persistence of these amide derivatives in rumen fluids in an active state for a significant period of time. When metabolized by the ruminant, the novel compounds yield halo acids which are readily excreted in the urine, and an aminoalcohol which is known to occur naturally.

Activity of the described compounds in inhibiting methane formation, increasing the proportion of desirable propionic and butyric acids and generally improving the efficiency of feed utilization in ruminants can be demonstrated by both in vitro and in vivo tests. Testing of all compounds by long term feeding tests in representative animals is prohibitive both in time and in the amounts of feed and additive compounds consumed. It has been found that fermentation processes equivalent to those which occur in the rumen can be established under laboratory conditions and that the results obtained from such laboratory fermentations correlate closely with actual experience in ruminants with respect to feed utilization, and particularly with respect to methane suppression, production of fatty acids and toxicity to the rumen organisms.

The artificial rumen tests which are known to correlate with animal studies and are those employed herein are of three types. In all tests, the principal component of the fermentation medium is rumen fluid collected from fasted sheep and strained through multiple layers of sterile cheesecloth. The medium is buffered to pH 6.8 and maintained at 39° C. throughout the test period. The test vessel is flushed with inert gas to remove oxygen prior to testing. Total quantities of gas produced are measured and the gas is analyzed by gas-liquid phase chromatography. Where applicable, the volatile fatty acid composition is determined by analyzing an aliquot portion of the fermentation liquid by gas-liquid chromatography.

In the first series of tests, the test compound is added to the fermentation medium at the rate of 250 mg. of compound per milliliter. Gas samples are collected over a period of 2.5 hours and the gas is analyzed for methane. The following compounds are found to give essentially 100 percent suppression of the formation of methane in the fermentation over the test period:

1. dichloroacetamide
2. 2,2-dichloropropionamide
3. 2-bromopropionamide
4. 2,2,3-trichloropropionamide
5. N-p-chlorophenyl chloroacetamide
6. 2-bromo-2-methylpropionamide
7. chloroacetamide
8. dibromoacetamide
9. 2-chloropropionamide
10. trichloroacetamide
11. N-cyclohexyl-2,2-dichloropropionamide
12. N-2-(p-nitrophenyl)ethyl dichloracetamide
13. N,N-dimethyl dichloracetamide
14. bis (dichloroacetamido) ethane
15. N-dichloroacetyl serine anilide
16. N-(2-carboxy-5-aminophenyl)dichloroacetamide
17. N-(m-ethoxy-p-carboxyphenyl)dichloroacetamide
18. N-(3-chloro-5sulfonamidophenyl)dichloroacetamide
19. N-(2-thiazolyl)-2,2-dichloropropionamide
20. N-(p-tolyl)-2,2-dichloropropionamide
21. N-(p-nitrophenyl)-2,2-dichloropropionamide
22. N-(4-pyridyl)-2,2-dichloropropionamide
23. N-(p-carboethoxyphenyl)-2,2-dichloropropionamide
24. N-benzyl-2,2-dichloropropionamide
25. N-(2-pyrimidyl)-2,2-dichloropropionamide
26. N-[1-(p-[methylthio]benzoyl)-2-hydroxyethyl]dichloroacetamide
27. N-[p-(methylthio)benzoylmethyl]dichloroacetamide
28. N-(p-carboxyphenyl)-dichloroacetamide
29. N-(N',N'-dimethylaminoethyl)-2,2-dichloropropionamide hydrochloride
30. N-methyl chloroacetamide
31. N-benzyl chloroacetamide
32. p-nitro-dichloroacetanilide
33. 2,2-dichlorobutyramide
34. N-dimethylamino-2,2-dichloropropionamide
35. 2,3-dichloropropionamide
36. Diiodoacetamide
37. N,N-dimethyl-2,2-dichloropropionamide
38. 4-(2,2-dichloropropionyl) morpholine
39. N-(2-thiazolyl)dichloroacetamide
40. 2,2-dichlopropionyl urea
41. p-2,2-dichloropropionobromoanilide
42. 2,2-dichloropropionanilide
43. 2,2-dichloro-2-phenylacetamide
44. Tribromoacetamide
45. 2,2-dibromopropionamide
46. N-cyclohexyl dichloroacetamide
47. N-cyclohexyl trichloroacetamide
48. 1,2-bis (2,2-dichloropropionamide) ethane
49. N-methyl-2,2-dichloropropionamide
50. 2',6'-dimethyl 2,2-dichloropropionanilide
51. N-cyclohexyl dibromoacetamide
52. 2,2-dichloropropionyl thiourea
53. m-2,2-dichloropropionaniside
54. 1,2-bis (dibromoacetamido) ethane
55. N-[p-(1-methyl-5-nitro-2-imidazolyl) phenyl]dichloroacetamide
56. N-cyclohexyl-2,2-dibromopropionamide
57. 1,2-bis (2,2-dibromopropionamide) ethane
58. 2,2-dibromopropionyl urea
59. 2,2-dichlorobutyryl urea
60. 2,2-dibromoacetyl urea
61. 2,2-dichloroacetyl urea
62. N-cyclohexyl tribromoacetamide
63. N-ethyl-2,2-dibromo-2-cyclohexyl acetamide
64. N-cyclohexyl-2,2-dichlorobutyramide
65. 1,3-bis (2,2-dichloro-propionamido) propane
66. N-(t-butyl)-2,2-dichloropropionamide
67. N-acetyl-2,2-dichloroacetamide
68. 1,6-bis (2,2-dichloropropionamido) hexane
69. p-hydroxy 2,2-dichloropropionanilide
70. N-benzyl-2,2-dichloroacetamide
71. N,N'-bis (2,2-dichloropropionyl) urea
72. 1,5-di (2,2-dichloropropionyl) biuret
73. N-[p-(carbomethoxymethyl carbamyl) phenyl]-2,2-dichloropropionamide
74. 1,8-bis (dichloroacetamido) n-octane
75. N-(n-butyl)-2,2-dichloropropionamide
76. 1-(2,2-dichloropropionyl) biuret
77. p-carboethoxyphenyl dichloroacetamide
78. N-(2,2-dichloropropionoxyethyl)-2,2-dichloropropionamide
79. N-dichloroacetyl-N'-p-carboethoxyphenyl urea
80. N-dichloroacetyl-N'-p-carboxyphenyl urea
81. 1,2-propylene-bis-dichloroacetylcarbamate
82. N-trimethylolmethyl dichloroacetamide
83. N-carboethoxymethyl-2,2-dichloropropionamide
84. N-(2-hydroxypropyl) dichloroacetamide
85. 3-(dichloroacetamido) propionic acid
86. N-dichloroacetyl-N',N'-dimethyl urea
87. N-(1,3-dihydroxy-t-butyl) dichloroacetamide
88. N-carboethoxymethyl dichloroacetamide
89. N-(1-hydroxy-2-n-butyl) dichloracetamide
90. N-(hydroxy-t-butyl) dichloroacetamide
91. N-hydroxyethyl ethylene-bis-dichloracetamide
92. N-(2-hydroxyethoxy-1-ethyl) dichloracetamide
93. N-2-hydroxyethyl dichloroacetamide
94. N-3-hydroxypropyl dichloroacetamide
95. N-carbamylmethyl dichloroacetamide
96. N-(2 hydroxyethyl)-2,2-dichloropropionamide
97. N-dichloroacetyl-N'-methyl urea
98. N-(2-dichloroacetoxyethyl) dichloroacetamide
99. N-(2-acetoxyethyl) dichloroacetamide
100. N-dichloroacetyl-N'-2-carbamoylethyl urea
101. N-hydroxymethyl dichloroacetamide
102. 2-dichloroacetamido-tetrahydro-2 H-1,32-oxazaphosphorine-2-oxide
103. N-(2-hydroxypropyl) trichloroacetamide
104. N-(2-hydroxyethyl) trichloroacetamide
105. N-hydroxymethyl-2,2-dichloropropionamide
106. 2,2,3-trichloropropionyl urea
107. N,N'-bis (dichloroacetyl) urea
108. N-(2,3-dihydroxypropyl) dichloroacetamide
109. N,N'-bis (dichloroacetyl)-2-hydroxy-1,3-propylenediamine
110. N-(1,3-dichloro-t-butyl)dichloroacetamide
111. N-(dichloroacetamidomethyl) pyridinium chloride
112. N-(2-carbamoylexyethyl) dichloroacetamide
113. N-(dichloroacetamidopropoxyethoxyethoxypropyl) dichloroacetamide
114. N-[3-(di-hydroxyethylamino) propyl]dichloroacetamide
115. 3-carbamyl-1-(dichloroacetamidomethyl) pyridinium chloride
116. 3-cyano-1-(dichloroacetamidomethyl) pyridinium chloride
117. N-methylsulfonylmethyl dichloroacetamide
118. N-2-(p-nitrobenzoyloxyethyl)dichloroacetamide
119. 3-carboxy-1-(dichloroacetamidomethyl) pyridinium chloridenicotinic acid complex
120. Dichloroacetamidoethyl N,N,N',N'-tetramethylphosphorodiamidate
121. N-2-chloroethyl dichloroacetamide
122. poly Dichloroacetyl derivative of tetraethylene pentamine
123. N-(Hydroxyethoxyethoxypropyl) dichloroacetamide
124. N-chloromethyl dichloroacetamide
125. 2-(4'-thiazolyl)-4(5)-dichloroacetamido benzimidazole
126. N-6-hydroxy-1-hexyl) dichloroacetamide
127. 2-(dichloroacetyloxyethyl) ammonium tosylate
128. N-[2-(N-morpholino) ethyl] dichloroacetamide 129. 2-(dichloroacetamidoethyl) nicotinate
130. bis (dichloroacetamido) methyl ether
131. tris (dichloroacetyl) melamine
132. 2,2,2-trichloroethanol
133. 1-ethoxy-2,2,2-trichloroethanol
134. 2,2,2-trichloro-t-butanol
135. hexachloroacetone
136. di (chloromethyl) sulfone
137. di (chloromethyl) sulfoxide
138. methyl dichloromethyl sulfone
139. N-phenyl dichloromethanesulfonamide
140. dichloromethanesulfonamide
141. 2,2,2-trichloroethyl-3,5-dinitrobenzoate
142. 3,3-dichloro-5-phenyl-2-piperidone
143. 1,1,1-trichloro-3-methoxy-2-propanol
144. 1,1,1-trichloro-2,3-propyleneglycol
145. 1,1,1-trichloro-3-ethoxyisopropanol
146. diethyl trichloromethanephosphonate
147. trichloromethanephosphonic acid dianilide
148. poly (3,3,3-trichloropropylene oxide) (M.W. about 900)
149. 2-trichloromethyl-tetrahydro-2H-1,3,2-oxazaphosphorine-2-oxide
150. N,N'-bis-(dichloromethanesulfonyl)-1,8-octanediamine
151. 1-(3-ethoxy-1,1,1 trichloroisopropoxy)-3,3,3-trichloroisopropanol The foregoing compounds are representative of the broad class of compounds hereinbefore defined and substantially the same results are obtained when any of the various X, Y, Z, $R_1$, $R_2$, $R_3$, $R_4$, $R_5$, $R_6$, $R_7$ and $R_8$ groups, as previously described, is substituted for a corresponding group of the enumerated compounds.

In the second series of tests, the test compound is added to the standardized artificial rumen fermentation at several dosage levels and the inoculated fermentation medium is incubated at 39° C. for 24 hours against a control fermentation containing no test compound. Periodic agitation is provided throughout this period. At the conclusion of the test, gas samples are collected and analyzed, the percent reduction in methane produced, compared to the control, is plotted against concentration of test compound, and the dosage level required to produce a 50 percent reduction in methane production is calculated. These values are useful in comparing the relative activities of the test compound. Data obtained in this manner are presented in the following table, wherein the test compounds are identified by number in accordance with the enumeration hereinbefore given:

| Compound No. | Amount Required For 50 Reduction (μg. per ml.) |
| --- | --- |
| 1 | 3 |
| 2 | 43 |
| 3 | 15 |
| 4 | 8 |
| 5 | 31 |
| 6 | 12 |
| 7 | 23 |
| 8 | 1 |
| 9 | 55 |
| 10 | 8 |
| 11 | 5 |
| 12 | 17 |
| 13 | 125 |
| 14 | 5 |
| 15 | 5 |
| 16 | 26 |
| 17 | 26 |
| 18 | 5 |
| 19 | 11 |
| 20 | 11 |
| 21 | 80 |
| 22 | 13 |
| 23 | 12 |
| 24 | 5 |
| 25 | 95 |
| 26 | 10 |
| 27 | 6 |

Table — Continued

| | |
| --- | --- |
| 28 | 17 |
| 29 | 26 |
| 30 | 100 |
| 31 | 72 |
| 32 | 5 |
| 33 | 3 |
| 34 | 90 |
| 35 | 43 |
| 36 | 2 |
| 37 | 10 |
| 38 | 20 |
| 39 | 11 |
| 40 | 3 |
| 41 | 9 |
| 42 | 7 |
| 43 | 12 |
| 44 | 2 |
| 45 | 2 |
| 46 | 3 |
| 47 | 3 |
| 48 | 5 |
| 49 | 8 |
| 50 | 5 |
| 51 | 3 |
| 52 | 40 |
| 53 | 10 |
| 54 | 7 |
| 55 | 16 |
| 56 | 6 |
| 57 | 3 |
| 58 | 6 |
| 59 | 4 |
| 60 | 13 |
| 61 | 4 |
| 62 | 3 |
| 63 | 12 |
| 64 | 4 |
| 66 | 35 |
| 67 | 28 |
| 68 | 3 |
| 69 | 4 |
| 70 | 3 |
| 71 | 5 |
| 72 | 25 |
| 73 | 6 |
| 74 | 2 |
| 75 | 3 |
| 76 | 90 |
| 77 | 3 |
| 78 | 16 |
| 79 | 14 |
| 80 | 22 |
| 81 | 58 |
| 82 | 58 |
| 83 | 9 |
| 84 | 7 |
| 85 | 30 |
| 86 | 14 |
| 87 | 32 |
| 88 | 5 |
| 89 | 14 |
| 90 | 14 |
| 91 | 8 |
| 92 | 4 |
| 93 | 8 |
| 94 | 5 |
| 95 | 9 |
| 96 | 9 |
| 97 | 4 |
| 98 | 7 |
| 99 | 9 |
| 100 | 6 |
| 101 | 2 |
| 102 | 25 |
| 103 | 11 |
| 104 | 3 |
| 105 | 9 |
| 106 | 11 |
| 107 | 3 |
| 108 | 19 |
| 109 | 11 |
| 110 | 10 |
| 111 | 4 |
| 112 | 3 |
| 113 | 6 |
| 114 | 80 |
| 115 | 4 |
| 116 | 4 |
| 117 | 6 |
| 118 | 2 |
| 119 | 6 |
| 120 | 12 |
| 121 | 2 |

| Compound No. | Amount Required For 50 Reduction (μg. per ml.) |
|---|---|
| 122 | 5 |
| 123 | 4 |
| 124 | 1 |
| 125 | 5 |
| 126 | 2 |
| 127 | 12 |
| 128 | 16 |
| 129 | 4 |
| 130 | 3 |
| 131 | 40 |
| 132 | 3 |
| 133 | 19 |
| 134 | 17 |
| 135 | 58 |
| 136 | 1 |
| 137 | 58 |
| 138 | 3 |
| 139 | 30 |
| 140 | 7 |
| 141 | 5 |
| 142 | 5 |
| 143 | 1 |
| 144 | 1 |
| 145 | 1 |
| 146 | 13 |
| 147 | 6 |
| 148 | 8 |
| 149 | 4 |
| 150 | 11 |
| 151 | 2 |

Following the procedure described above, various test compounds are added to standardized rumen fermentations and are incubated for 24 hours against a control. At the end of 24 hours, samples of the fermentation fluid are collected and analyzed for volatile fatty acid content. Results of these analyses are presented in the table below as the ratio of acetic acid to the total of propionic, butyric and valeric acids in the rumen fluids. Thus, a reduction in this ratio indicates that the test compound is effective in shifting the volatile fatty acid composition to the more desirable propionic, butyric and valeric acids. Measurements are made of the total amount of methane and total fatty acids produced in both the control and experimental fermentations.

| Compound | Concentration (μg./ml.) | % CH$_4$ Produced | Ratio |
|---|---|---|---|
| 2,2-dichloropropionamide |  | 12 | 0.79 |
|  | 7 | 5 | 0.41 |
|  | 70 | 0 | 0.31 |
| dichloroacetamide |  | 10 | 0.73 |
|  | 7 | 0 | 0.40 |
|  | 13 | 0 | 0.48 |
| 2,2-dichloro-N-cyclohexyl propionamide |  | 8 | 0.94 |
|  | 11 | 2 | 0.52 |
|  | 22 | 0 | 0.42 |
| 2,2-dichloro-N-(p-trifluoromethylphenyl) propionamide |  | 8 | 0.94 |
|  | 14 | 4 | 0.60 |
|  | 29 | 2 | 0.53 |
| 2,2-dichloro-N-benzyl propionamide |  | 10 | 1.01 |
|  | 12 | 3 | 0.57 |
|  | 33 | 0 | 0.55 |
| 2,2,3-trichloropropionamide |  | 10 | 1.01 |
|  | 9 | 8 | 0.91 |
|  | 18 | 6 | 0.82 |
| bis (dichloroacetamido) ethane |  | 12 | 1.02 |
|  | 14 | 2 | 0.52 |
|  | 28 | 0 | 0.49 |
| 2,2-dichloro-N-(2-thiazolyl) propionamide |  | 12 | 1.02 |
|  | 11 | 8 | 0.76 |
|  | 23 | 4 | 0.59 |
| 2,2-dichloro-N-(4-pyridyl) propionamide |  | 9 | 1.07 |
|  | 11 | 7 | 0.61 |
|  | 22 | 5 | 0.48 |
| 2,2-dichloro-N-(p-carbethoxyphenyl) propionamide |  | 9 | 1.07 |
|  | 15 | 8 | 0.53 |
|  | 29 | 5 | 0.58 |
| 2,2,2-trichloroethanol |  | 9 | 0.73 |
|  | 8 | 9 | 0.69 |
|  | 15 | 0 | 0.39 |
| dibromoacetamide |  | 0 | 0.73 |
|  | 1 | 0 | 0.43 |

Table —Continued

| Compound | Concentration | % CH$_4$ Produced | Ratio |
|---|---|---|---|
|  | 5 | 0 | 0.42 |
|  | 9 | 9 | 0.58 |
| trichloroacetamide | 8 | 3 | 0.44 |
|  | 16 | 0 | 0.33 |
| N-cyclohexyl-2,2-dichloroacetamide |  | 9 | 0.62 |
|  | 11 | 1 | 0.41 |
|  | 21 | 0 | 0.44 |
| 2,2-dichloropropionyl urea |  | 9 | 0.62 |
|  | 9 | 4 | 0.58 |
|  | 19 | 0 | 0.47 |
| diiodoacetamide |  | 9 | 0.55 |
|  | 2 | 2 | 0.42 |
|  | 3 | 0 | 0.19 |
| 2,2-dichlorobutyramide |  | 7 | 0.70 |
|  | 8 | 3 | 0.44 |
|  | 16 | 0 | 0.42 |
| N,N-dimethyl-2,2-dichloropropionamide |  | 9 | 0.68 |
|  | 17 | 5 | 0.63 |
|  | 85 | 1 | 0.48 |
| tribromoacetamide |  | 10 | 0.72 |
|  | 3 | 5 | 0.59 |
|  | 15 | 0 | 0.56 |
| 2,2-dibromopropionamide |  | 10 | 0.72 |
|  | 2 | 3 | 0.52 |
|  | 12 | 0 | 0.63 |
| 2,2-dichloro-3-phenylacetamide |  | 10 | 0.79 |
|  | 10 | 10 | 0.67 |
|  | 51 | 3 | 0.58 |
| 2,2-dichloropropionanilide |  | 10 | 0.78 |
|  | 11 | 5 | 0.63 |
|  | 22 | 0 | 0.49 |
| 2,6'-dimethyl 2,2-dichloropropionanilide |  | 10 | 0.75 |
|  | 12 | 6 | 0.51 |
|  | 25 | 2 | 0.50 |
| N-cyclohexyl trichloro- |  | 10 | 0.85 |
|  | 2 | 10 | 0.63 |
|  | 12 | 1 | 0.57 |
| 1,2-bis (2,2-dibromopropionamido) ethane |  | 10 | 0.85 |
|  | 2 | 4 | 0.67 |
|  | 5 | 2 | 0.65 |
| N-cyclohexyl-2,2-dibromoacetamide |  | 10 | 0.83 |
|  | 3 | 4 | 0.67 |
|  | 15 | 0 | 0.58 |
| di(chloromethyl) sulfone |  | 10 | 0.86 |
|  | 2 | 1 | 0.65 |
|  | 8 | 0 | 0.67 |
| methyl dichloromethyl sulfone |  | 10 | 0.86 |
|  | 8 | 3 | 0.67 |
|  | 16 | 0 | 0.60 |
| N,N'-bis (dichloroacetyl) 1,8-octane diamine |  | 12 | 0.86 |
|  | 2 | 5 | 0.78 |
|  | 9 | 0 | 0.61 |
| N-p-carboethoxyphenyl-2,2-dichloroacetamide |  | 11 | 0.86 |
|  | 3 | 9 | 0.80 |
|  | 14 | 5 | 0.73 |
| m-2,2dichloropropionophenolide |  | 10 | 0.83 |
|  | 6 | 6 | 0.73 |
|  | 12 | 1 | 0.69 |
| 2,2-dichlorobutyryl urea |  | 10 | 0.76 |
|  | 5 | 7 | 0.84 |
|  | 10 | 5 | 0.67 |
| N,N'-bis (2,2-dichloropropionyl) urea |  | 10 | 0.76 |
|  | 8 | 7 | 0.63 |
|  | 16 | 3 | 0.58 |
| 2,2-dibromopropionyl urea |  | 9 | 0.61 |
|  | 6 | 6 | 0.67 |
|  | 27 | 0 | 0.65 |
| N-(methylsulfonylmethyl) |  | 9 | 0.78 |
|  | 11 | 5 | 0.60 |
|  | 22 | 1 | 0.60 |
| N-(2-carbamoyloxyethyl) dichloroacetamide |  | 7 | 0.71 |
|  | 5 | 3 | 0.66 |
|  | 11 | 11 | 0.62 |
| N-(p-nitrobenzoyloxyethyl) dichloroacetamide |  | 7 | 0.71 |
|  | 8 | 3 | 0.58 |
|  | 16 | 0 | 0.57 |
| 3,3,3-trichloropropylene glycol |  | 9 | 0.78 |
|  | 2 | 6 | 0.61 |
|  | 9 | 2 | 0.50 |
| 1,1,1-trichloro-3-methoxy-2-propanol |  | 9 | 0.78 |
|  | 2 | 7 | 0.56 |
|  | 10 | 2 | 0.39 |

In order to provide a still longer term study of the effects of the test compounds on rumen fermentation, continuous cultures of the type described by Slyter et al. in *Applied Microbiology*, Vol. 12, pages 374–377 (1964) and Rufener et al. in *Applied Microbiology*, Vol. 11, pages 196–201 (1963) are established and test compounds are added thereto. Comparison of the treated fermentations with the controls provides a measure of the effectiveness of the test compounds in eliminating methane and decreasing the ratio of acetic acid to the total of propionic, butyric and valeric acids (calculated as above) in long term continuous rumen fermentations. The results of this series of tests are shown in the following table. All of the test compounds gave essentially complete inhibition of methane production at the levels used.

| Compound | Concentration ($\mu$g./ml.) | Ratio Control | Ratio Treated |
|---|---|---|---|
| 2,2-dichloropropionamide | 100 | 0.85 | 0.63 |
|  | 50 | 0.82 | 0.51 |
| dichloroacetamide | 10 | 0.82 | 0.53 |
| dibromoacetamide | 5 | 0.74 | 0.51 |
| N-cyclohexyl trichloro-acetamide | 20 | 0.68 | 0.60 |
| m-2,2-dichloropropiono-phenolide | 30 | 0.68 | 0.59 |
| N-(p-carboethoxyphenyl)-2,2-dichloroacetamide | 30 | 0.67 | 0.49 |
| N-(2-hydroxypropyl) dichloro-acetamide | 15 | 0.70 | 0.58 |
| N-(2-hydroxyethoxy-2-ethyl) dichloroacetamide | 17 | 0.68 | 0.54 |
| N-2-hydroxyethyl dichloro-acetamide | 15 | 0.68 | 0.50 |
| N-3-hydroxypropyl dichloro-acetamide | 15 | 0.65 | 0.46 |

The foregoing data demonstrates the effectiveness of the disclosed classes of compounds in reducing methane formation and decreasing the ratio of acetic acid to propionic, butyric and valeric acids in rumen fermentation. In preferred embodiments, essentially complete inhibition of methane, together with a significant improvement in the proportion of higher volatile fatty acids is achieved. An increase in total energy content of fatty acid products is also achieved.

Correlation of the above-described rumen fermentation tests with animal studies is demonstrated by data obtained from animal feeding tests such as those described in the following examples:

Example 3–A 6-week animal feeding study is carried out by maintaining three separate groups of sheep on diets of untreated alfalfa pellets, alfalfa pellets containing 0.006 percent by weight of N-(2-hydroxypropyl) dichloroacetamide, and alfalfa pellets containing 0.024 percent by weight N-(2-hydroxypropyl) dichloroacetamide, respectively. The amount of feed consumed by each test animal is controlled and recorded and each animal is weighed weekly.

At the conclusion of the test period, the amounts of feed consumed and the total weight gain for each animal is computed and the averages for each group are calculated. It is found that the control animals feed untreated feed gain an average of 11.4 pounds per 100 pounds of feed consumed. By comparison, animals fed a diet containing 0.006 percent of the test compound gain an average of 12.4 pounds per 100 pounds of feed consumed and those fed a diet containing 0.024 percent of the test compound gain an average of 12.8 pounds on the same amount of feed. Thus, it is apparent that the use of N-(2-hydroxypropyl) dichloroacetamide provides a significant improvement in feed efficiency in the test animals.

Example 4–Five wethers and one ewe ranging in age from 19 to 26 weeks and in weight from 40 to 60 Kgm. are each drenched with 2 gm. of thiabendazole. Each animal is hand-fed to appetite twice daily, with a control ration of alfalfa pellets for a period of 8 weeks.

At the completion of the initial 8-week period, a portion of the test group is switched to a pelleted feed composition prepared by blending nine parts of the same pelleted alfalfa used in the control feeding with one part of alfalfa premix containing 3.4 gm. of 2,2-dichloropropionamide per kilogram of premix. The final feed thus contains 0.034% by weight of the test compound. The remaining animals are maintained on the untreated pelleted alfalfa. Each control and experimental animal is hand-fed a limited ration of feed, twice daily. Samples of rumen fluids are taken and analyzed daily and weights are recorded weekly.

At the end of 8 weeks, it is found that the sheep maintained on alfalfa pellets containing 2,2-dichloropropionamide have an average daily weight gain of 139 gm. against an average daily gain of 112 gm. for the control animals. The test animals gain an average of 8.3 pounds per body weight per 100 pounds of feed consumed while the control animals gain only an average of 6.3 pounds per 100 pounds of feed. For the treated animals, the average volatile fatty acid ratio in the rumen is 62:28:9 (acetic:propionic:butyric), whereas the average ratio for control animals is 68:23:8. The ratio of propionic acid to acetic acid is 0.46 for the treated animals and 0.34 for the controls. Thus, animals fed the treated feed gain more weight than those fed the untreated feed, and show an improvement in feed efficiency as well as a shift in volatile fatty acid composition to the more desirable propionic acid.

In accordance with this invention, the compounds described are administered orally to ruminants, either separately or admixed with feed. Incorporation of the compound in the animals' feed is the preferred mode of administration because of convenience and because it ensures that the compound and the feed material will be present simultaneously in the rumen. Precise dosages will vary depending on a number of factors, including the relative activity of the compound employed, the feed material used, age of the animals, etc. In general, concentrations of active compound of the order of about 0.005 percent to about 0.05 percent of the total feed composition are found satisfactory. By basing the dosage on concentration in the feed, the daily dosage is automatically regulated with regard to body weight and age by the animal's appetite. The feed compositions will, of course, also contain at least one element of the ruminant's diet, the element or elements present being those known to be suitable for the particular ruminant. Typical useful feed elements include grains such as barley, milo, and corn; cellulosic roughage components such as hay, alfalfa, straw or cereal brans; vegetable and animal oils such as fish oil or soybean oil; nutritional supplements such as vitamin, mineral and nitrogenous preparations, cottonseed meal, soybean meal; and stabilizers such as preservatives or antioxidants. The precise components chosen will depend also on local conditions such as availability of particular feedstuffs at reasonable prices, pasturage and the like. A specific example of a suitable cattle feed could include:

50% shelled corn
35% alfalfa meal
10% soybean meal (44% protein)
5% molasses
0.24% N-(2-hydroxypropyl) dichloroacetamide It is generally most convenient to employ the compounds in the form of a concentrated premix containing at least one element of the ruminant's diet and an amount of the active compound of the order of about 0.05% to about 1.0% by weight of the total premix. The premix can also include such diet additives or supplements as vitamin supplements, growth promoters and the like. Final feed compositions are prepared by blending together suitable amounts of premix and other feed components, say one part of the former to nine parts of the latter.

In the foregoing description, the invention has been described by reference to certain specific illustrative embodiments thereof. It will be understood, however, that the invention is not limited to the specific embodiments described but encompasses all such modifications and variations as fall within its general scope.

What is claimed is:

1. A method for suppressing methane formation in the rumen of ruminants which comprises administering orally to said ruminant a methane suppressing amount of at least one N-hydroxyalkylamide compound selected from the group consisting of

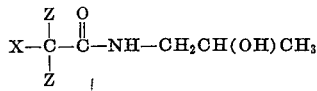

and

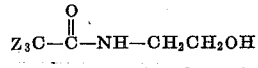

wherein X is hydrogen, loweralkyl having from 1–9 carbon atoms, lower cycloalkyl having from 5–7 carbon atoms, phenyl, nitrophenyl, methylphenyl, ethylphenyl, trifluoromethylphenyl, chlorine, bromine or iodine and Z is chlorine, bromine, or iodine.

2. A ruminant feed composition comprising at least one element of ruminant nutrition and a methane-suppressing amount of at least one compound selected from the group consisting of

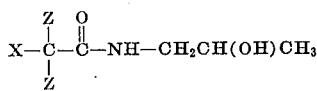

and

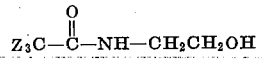

wherein X is hydrogen, loweralkyl having from 1–9 carbon atoms, lower cycloalkyl having from 5–7 carbon atoms, phenyl, nitrophenyl, methylphenyl, ethylphenyl, trifluoromethylphenyl, chlorine, bromine, or iodine and Z is chlorine, bromine, or iodine.

3. A ruminant feed supplement premix composition comprising at least one element of ruminant nutrition having dispersed therein from about 0.05% to about 1.0% by weight of at least one N-hydroxyalkyl amide compound selected from the group consisting of

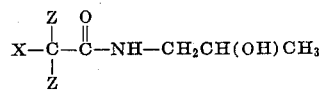

and

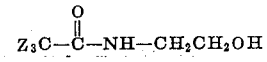

wherein X is hydrogen, loweralkyl having from 1–9 carbon atoms, lower cycloalkyl having from 5–7 carbon atoms, phenyl, nitrophenyl, methylphenyl, ethylphenyl, trifluoromethylphenyl, chlorine, bromine, or iodine and Z is chlorine, bromine, or iodine.

4. The composition of claim 3 wherein said N-hydroxy alkyl amide compound is N-(2-hydroxypropyl) dichloroacetamide.

5. The composition of claim 3 wherein said N-hydroxyalkylamide compound is N-(2-hydroxypropyl) trichloroacetamide.